US012784949B2

(12) United States Patent
Peng et al.

(10) Patent No.: US 12,784,949 B2
(45) Date of Patent: Nov. 3, 2026

(54) LARGE SINTERED R-Fe-B MAGNET, PREPARATION METHOD AND USE THEREOF

(71) Applicant: YANTAI ZHENGHAI MAGNETIC MATERIAL CO., LTD., Yantai (CN)

(72) Inventors: Buzhuang Peng, Yantai (CN); Dongdong Li, Yantai (CN); Junjia Xiang, Yantai (CN); Guodong Su, Yantai (CN); Meng Xue, Yantai (CN)

(73) Assignee: YANTAI ZHENGHAI MAGNETIC MATERIAL CO., LTD., Yantai (CN)

( * ) Notice: Subject to any disclaimer, the term of this patent is extended or adjusted under 35 U.S.C. 154(b) by 87 days.

(21) Appl. No.: 18/840,292

(22) PCT Filed: Jul. 18, 2023

(86) PCT No.: PCT/CN2023/107860
§ 371 (c)(1),
(2) Date: Aug. 21, 2024

(87) PCT Pub. No.: WO2024/139182
PCT Pub. Date: Jul. 4, 2024

(65) Prior Publication Data

US 2025/0166875 A1 May 22, 2025

(30) Foreign Application Priority Data

Dec. 30, 2022 (CN) ......................... 202211734983.2

(51) Int. Cl.
*H01F 1/057* (2006.01)
*C22C 38/00* (2006.01)
(Continued)

(52) U.S. Cl.
CPC ......... *H01F 1/0577* (2013.01); *C22C 38/002* (2013.01); *C22C 38/005* (2013.01);
(Continued)

(58) Field of Classification Search
CPC ............... H01F 1/0577; H01F 41/0253; H01F 41/0293; H01F 1/057; H01F 1/0536;
(Continued)

(56) References Cited

U.S. PATENT DOCUMENTS

| | | | |
|---|---|---|---|
| 9,786,419 | B2 | 10/2017 | Liang et al. |
| 10,530,198 | B2 | 1/2020 | Tsukamoto et al. |

(Continued)

FOREIGN PATENT DOCUMENTS

| | | | |
|---|---|---|---|
| CN | 103295713 A | 9/2013 | |
| CN | 106463223 A | 2/2017 | |

(Continued)

OTHER PUBLICATIONS

Masuzawa Kiyoyuki et.al. [JP2020167209A] (machine translation) (Year: 2020).*

*Primary Examiner* — Danielle M. Carda
*Assistant Examiner* — Nazmun Nahar Shams
(74) *Attorney, Agent, or Firm* — NKL Law; Allen Xue

(57) ABSTRACT

A large sintered R—Fe—B magnet, a preparation method and use thereof are provided. The sintered R—Fe—B magnet has a thickness not less than 10 mm in an orientation direction. Any cross section along the orientation direction is marked as a diffusion cross-section area, and a side of the diffusion cross-section area close to the outer surface of the sintered R—Fe—B magnet is marked as the surface of the diffusion cross-section area. The difference between the coercivity of the surface of the diffusion cross-section area and the coercivity at 5 mm away from the surface of the diffusion cross-section area is ΔH, and ΔH is ≤50 kA/m.

17 Claims, 1 Drawing Sheet

Schematic of M layer and RH layer after DW thermal treatment

(51) Int. Cl.

| | |
|---|---|
| ***C22C 38/06*** | (2006.01) |
| ***C22C 38/10*** | (2006.01) |
| ***C22C 38/14*** | (2006.01) |
| ***C22C 38/16*** | (2006.01) |
| ***C23C 8/72*** | (2006.01) |
| ***C23C 8/80*** | (2006.01) |
| ***C23C 24/10*** | (2006.01) |
| ***H01F 41/02*** | (2006.01) |

(52) U.S. Cl.
CPC .............. *C22C 38/06* (2013.01); *C22C 38/10* (2013.01); *C22C 38/14* (2013.01); *C22C 38/16* (2013.01); *C23C 8/72* (2013.01); *C23C 8/80* (2013.01); *C23C 24/103* (2013.01); *H01F 41/0253* (2013.01); *C22C 2202/02* (2013.01)

(58) Field of Classification Search
CPC ...... H02K 1/02; C22C 38/002; C22C 38/005; C22C 38/06; C22C 38/10; C22C 38/14; C22C 38/16; C23C 8/72; C23C 8/80; C23C 24/103
USPC ............................................................ 419/40
See application file for complete search history.

(56) References Cited

U.S. PATENT DOCUMENTS

2009/0020193 A1 1/2009 Ohta et al.
2011/0260816 A1 * 10/2011 Morimoto ............. H01F 1/0577 335/302
2021/0407713 A1 12/2021 Luo et al.

FOREIGN PATENT DOCUMENTS

CN 108039259 A 5/2018
CN 111755235 A 10/2020
CN 112927921 A 6/2021
CN 113808839 A 12/2021
CN 114360831 A 4/2022
CN 115116728 A 9/2022
JP 2006179963 A 7/2006
JP 2011223007 A 11/2011
JP 2020167209 A 10/2020
WO 2016093173 A1 6/2016

* cited by examiner

Schematic of M layer and RH layer after DW thermal treatment

LARGE SINTERED R-Fe-B MAGNET, PREPARATION METHOD AND USE THEREOF

CROSS-REFERENCE TO RELATED APPLICATIONS

This application is a U.S. national stage entry of PCT International Application No. PCT/CN2023/107860, filed on Jul. 18, 2023, which claims priority to the patent application No. 202211734983.2 entitled "LARGE SINTERED R-FE-B MAGNET, PREPARATION METHOD AND USE THEREOF", filed with the China National Intellectual Property Administration on Dec. 30, 2022, the content of which is incorporated herein by reference in its entirety.

TECHNICAL FIELD

The present disclosure relates to the field of rare earth permanent magnet materials, and particularly, to a large sintered R—Fe—B magnet, a preparation method and use thereof.

BACKGROUND

In the current global trend of low-carbon economy and energy revolution, countries pay more and more attention to green energies. Reducing fossil energy combustion and accelerating the development and utilization of renewable energies have become the orientation of the countries in the world. Wind power, as a technically mature and environment-friendly renewable energy, is widely adopted throughout the world, and has become the most frequently used renewable energy along with hydropower. Currently, wind power technology has been gradually perfected, and the installation capacities of onshore wind power and offshore wind power are increasing year by year. Sintered neodymium-iron-boron permanent magnets are used in wind power generators, which consist of nearly one-third of the cost of the generator. Along with the rapid development of large engineering machinery, the demand for neodymium-iron-boron permanent magnet in generators is also increased. Such an industry requires a large size of magnet, with the thickness of the products basically being 10 mm or greater.

Along with the increasing use of rare earth permanent magnet materials, the price of heavy rare earth materials is remarkably increased due to scarcity of heavy rare earth materials, and reducing the consumption of heavy rare earth materials has become an urgent problem for large sintered magnets. The grain boundary diffusion has been used in the massive production of sintered neodymium-iron-boron magnets, which diffuses heavy rare earth elements Dy and Tb disposed on the surface of the sintered neodymium-iron-boron magnet into the interior of the sintered neodymium-iron-boron magnet along the grain boundary, thus improving the micro structure of the grain boundary and elevating the coercivity of the sintered neodymium-iron-boron magnets. By suppressing the magnetic exchange coupling effect in the grain boundary, the method achieves magnetic hardening of the grain boundary, and greatly elevates the coercivity of the sintered neodymium-iron-boron magnets with basically no decrease in the remanence of the sintered neodymium-iron-boron magnets. The grain boundary diffusion is achieved by disposing heavy rare earth elements on the surface of the sintered neodymium-iron-boron magnet, allowing the grain boundary phase in a molten state at a high temperature, and diffusing by means of the concentration difference of heavy rare earth between the surface and the interior of the sintered neodymium-iron-boron magnet. For a magnet with a smaller thickness, the heavy rare earth may easily diffuse into the central part of the magnet, and the distribution of the heavy rare earth for diffusion may be relatively uniform at both the grain boundary of the surface of the magnet and the grain boundary of the interior of the magnet. However, the diffusion of the heavy rare earth into the magnet becomes harder along with the increase of the thickness of the magnet, and directly increasing the quantity of the heavy rare earth disposed on the surface of the magnet may lead to the rapid rise of the product cost. As such, a grain boundary diffusion process or method for large sintered magnets may have great application value.

SUMMARY

The present disclosure provides a sintered R—Fe—B magnet having a thickness not less than 10 mm in an orientation direction, wherein any cross section along the orientation direction is marked as a diffusion cross-section area, a side of the diffusion cross-section area close to the outer surface of the sintered R—Fe—B magnet is marked as the surface of the diffusion cross-section area, and the difference between the coercivity of the surface of the diffusion cross-section area and the coercivity at 5 mm away from the surface of the diffusion cross-section area is ΔH, wherein ΔH≤50 kA/m. In the present disclosure, the surface of the diffusion cross-section area is preferably a part 1 mm away from the outer surface of the sintered R—Fe—B magnet.

According to an embodiment of the present disclosure, ΔH is, e.g., not greater than 45 kA/m, such as 42 kA/m or 38 kA/m.

According to an embodiment of the present disclosure, the thickness in the orientation direction is, e.g., 10 mm to 20 mm, such as 11 mm or 15 mm.

According to an embodiment of the present disclosure, the raw materials of the sintered R—Fe—B magnet comprise R, B, Fe, and M, wherein:

R has a content by weight of 27 wt %-34 wt %, preferably 29 wt %-32 wt %, such as 30.2 wt %;

M has a content by weight of 0 wt %-5 wt %, preferably 0 wt %-3 wt %, such as 2 wt %.

According to an embodiment of the present disclosure, R is selected from at least one of rare earth elements Nd, Pr, Tb, Dy, Gd, and Ho.

According to an embodiment of the present disclosure, M is selected from at least one of Ti, V, Cr, Mn, Co, Ga, Cu, Si, Al, Zr, Nb, W, and Mo.

The present disclosure further provides a preparation method of the sintered R—Fe—B magnet described above, comprising the following steps:

(1) manufacturing a blank of the R—Fe—B magnet having a thickness ≥10 mm;

(2) diffusion part disposing: disposing diffusion parts on at least 2 surfaces in the orientation direction of the blank obtained in step (1), wherein each of the diffusion parts comprises at least 1 RH layer and 1 M layer, wherein the M layer is in direct contact with the surface of the blank, the RH layer is separated from the blank by at least 1 M layer; and (3) thermal diffusion treatment: conducting a thermal diffusion treatment on the blank with thick diffusion layers disposed in step (2) to give the sintered R—Fe—B magnet.

According to an embodiment of the present disclosure, in step (1), the blank of the R—Fe—B magnet is manufactured from the above raw materials of the sintered R—Fe—B magnet by methods known in the art, which is not specified in the present disclosure.

According to an embodiment of the present disclosure, in step (2), a RH layer and a M layer are alternately disposed in the diffusion parts, wherein the RH layer is separated from the blank by at least 1 M layer, the RH layer comprises 1-3 layers and the M layer comprises 1-3 layers.

According to an exemplary embodiment of the present disclosure, the diffusion part comprises 1 M layer and 1 RH layer.

According to an exemplary embodiment of the present disclosure, the diffusion part comprises 2 M layers and 2 RH layers disposed in an order from the surface of the blank of a first M layer, a first RH layer, a second M layer, and a second RH layer. Preferably, the first M layer and the second M layer may be identical or different. Preferably, the first RH layer and the second RH layer may be identical or different.

According to an embodiment of the present disclosure, in the diffusion part, each RH layer has a thickness of 1 μm to 70 μm, e.g., 10 μm, 20 μm, 30 μm, 40 μm, or 50 μm.

According to an embodiment of the present disclosure, the method for manufacturing the RH layer specifically comprises: applying an RH slurry on 2 surfaces of the blank in the orientation direction, and drying to give the RH layer.

According to an embodiment of the present disclosure, the RH slurry comprises a heavy rare earth element, an organic solid, and a solvent.

According to an embodiment of the present disclosure, the mass ratio of the heavy rare earth element to the organic solid to the solvent in the RH slurry is (40-70):(0.5-12):(0-50), e.g., 62:8:30 or 60:8:32.

According to an embodiment of the present disclosure, the heavy rare earth element includes at least one of metal dysprosium, metal terbium, dysprosium hydride, terbium hydride, dysprosium fluoride, terbium fluoride, dysprosium oxide, and terbium oxide.

According to an embodiment of the present disclosure, the organic solid is at least one selected from rosin-modified alkyd resin, thermoplastic phenolic resin, urea-formaldehyde resin, and polyvinyl butyral.

According to an embodiment of the present disclosure, the solvent is selected from at least one of an alcohol solvent (e.g., methanol or ethanol), an ether solvent (e.g., diethyl ether), and an aromatic hydrocarbon solvent (e.g., benzene); preferably, the solvent is ethanol.

According to an embodiment of the present disclosure, in the diffusion part, each M layer has a thickness less than 20 μm and greater than 0.1 μm, preferably less than or equal to 10 μm, e.g., 1 μm, 2 μm, 3 μm, 4 μm, or 5 μm.

According to an embodiment of the present disclosure, in the diffusion part, the thickness ratio of each RH layer to each M layer is (1-70):(0.1-20), e.g., 50:3, 40:3, 35:3, 40:2, or 35:2.

According to an embodiment of the present disclosure, the method for manufacturing the M layer specifically comprises: applying a slurry containing an M powder on 2 surfaces of the blank in the orientation direction, and drying to give the M layer.

According to an embodiment of the present disclosure, the slurry containing the M powder comprises the M powder, an organic solid, and a solvent.

According to an embodiment of the present disclosure, the mass ratio of the M powder to the organic solid to the solvent in the slurry containing the M powder is (20-70):(1-10):(0-50), e.g., 60:5:35 or 55:5:40.

According to an embodiment of the present disclosure, the M powder includes at least one of graphite powder, titanium powder, zirconium powder, molybdenum powder, tungsten powder, titanium oxide, zirconium oxide, molybdenum oxide, and tungsten oxide, and M powder has an oxygen atom content less than 3%, preferably less than 1%.

According to an embodiment of the present disclosure, the M powder comprises a powder having a particle size less than 5 μm, wherein a powder having a particle size of between 0.5 μm and 1.8 μm is more than 50%, preferably more than 65%, of the total mass of the powder.

Generally, as the diffusion progresses, the heavy rare earth on the surface of the magnet is consumed, and the concentration difference becomes smaller due to the decreasing heavy rare earth elements on the surface of the magnet. As such, the heavy rare earth elements cannot diffuse into the interior of the magnet (e.g., the part with a thickness in the orientation direction greater than or equal to 5 mm). On one hand, the consumption of the heavy rare earth disposed on the surface of the magnet and the thickness of the RH layer disposed are both significantly increased as the thickness of the magnet in the orientation direction increases; on the other hand, the diffusion path is greatly extended as the thickness of the magnet in the orientation direction increases. A conventional method for diffusion in a large magnet is to prolong the time of diffusion, but the effect may become less effective as the thickness increases. Thus the concentration of the heavy rare earth is required to be controlled in the diffusion process. In the present disclosure, the inventor found that the concentration of the RH heavy rare earth can be adjusted by alternately disposing M layers and RH layers and disposing at least 1 M layer between the blank and the RH layer. In addition, in the present disclosure, the M powder has a melting point of 1000° C. or higher, and thus does not melt or undergo other chemical reactions in the thermal diffusion treatment process. Thus the M layer forms a concentration adjusting layer between the RH layer and the blank, and the concentration of the heavy rare earth elements in the RH layer can be adjusted through the M layer at a high temperature. The inventors found that the particle size distribution of the particles of the M powder is a key factor for adjusting the concentration. A large particle size of the powder will lead to the erosion of the blank and thus pits or other defects on the surface of the magnet. A small particle size of the powder may result in a low concentration of the heavy rare earth elements due to excessive densification of the powder, failing to effectively adjust the concentration of the heavy rare earth elements. Also, a large particle size will lead to a low concentration of the heavy rare earth elements while a small particle size cannot adjust the concentration of the heavy rare earth elements. For the diffusion treatment of a large magnet, heavy rare earth elements are required to form a stable flow path in the grain boundary of the magnet due to the excessive diffusion thickness. A higher diffusion concentration may enrich the heavy rare earth on the surface layer of the magnet and block the diffusion of the heavy rare earth into the magnet, while a lower concentration may lead to insufficient driving force for diffusion, greatly prolonging thermal diffusion time, and elevating production cost. When the powder in the M layer meets the condition of the present disclosure, the effect of the thermal diffusion treatment is optimal. The inventor also found that because the chemical properties of neodymium and praseodymium in the grain boundary are very active, the neodymium and praseodymium on the grain boundary of the surface of the magnet are prone to occur a displacement reaction with oxygen, thus bringing oxygen into the grain boundary. When the content of impurities such as oxygen in the grain boundary is increased, the molten state of the grain boundary is disrupted, reducing the wettability of the diffusion path and the uniformity of the coercivity among the surface and the interior of the magnet. For a magnet with a proper thickness, this may be compensated by prolonging the thermal diffusion time. However, for a magnet with a thickness in the diffusion direction greater than 10 mm, the entrance of oxygen will significantly disrupt the diffusion path and the uniformity of the coercivity among the surface and the interior of the magnet, and prolonging the thermal diffusion time possesses little improvement on the uniformity but greatly increasing production cost. Therefore, in the present disclosure, the content of oxygen in the M powder should be not greater than 3%, preferably not greater than 1%.

According to an embodiment of the present disclosure, in step (3), the thermal diffusion treatment comprises at least a DW thermal treatment and an ST thermal treatment.

According to an embodiment of the present disclosure, the DW thermal treatment specifically comprises: after the temperature is raised to a DW temperature, holding the temperature for a period of time. Preferably, the DW temperature is 280° C. to 480° C., more preferably 320° C. to 400° C. Preferably, the time of the DW thermal treatment is greater than or equal to 2 h, e.g., 3 h, 5 h, or 10 h. The inventor found that the majority of the organic solid and solvent in the diffusion part was removed during the DW thermal treatment, and since the melting points of the powders in the M layer are 1000° C. or higher, after the removal of the organic solid and solvent, the M powder is in direct contact with the blank, i.e., the M layer forms a concentration adjusting layer in a powder state.

According to an embodiment of the present disclosure, the DW thermal treatment is conducted in vacuum.

According to an embodiment of the present disclosure, in step (3), the ST thermal treatment comprises a low-temperature thermal treatment and a high-temperature thermal treatment, wherein the temperature of the low-temperature thermal treatment is 750° C. to 890° C. (e.g., 830° C.), and the temperature of the high-temperature thermal treatment is 830° C. to 970° C. (e.g., 870° C. or 890° C.).

The difference between temperatures of the low-temperature thermal treatment and the high-temperature thermal treatment is greater than 30° C., the time of the low-temperature thermal treatment and/or the high-temperature thermal treatment is not greater than 50 h, and the holding time is ≥2 h.

Preferably, the ramping rate from the low-temperature thermal treatment to the high-temperature thermal treatment is 4-10° C./min, e.g., 5° C./min.

Preferably, the low-temperature thermal treatment comprises: after the temperature is raised to the temperature of the low-temperature thermal treatment, holding the temperature for a period of time.

Preferably, the high-temperature thermal treatment comprises: after the temperature is raised to the temperature of the high-temperature thermal treatment, holding the temperature for a period of time.

Preferably, the ramping rate during the low-temperature thermal treatment and the high-temperature thermal treatment is not specified, e.g., 4-10° C./min, such as 5° C./min.

According to a preferred embodiment of the present disclosure, in step (3), the ST thermal treatment comprises alternate low-temperature thermal treatments and high-temperature thermal treatments.

According to an embodiment of the present disclosure, the time of the ST thermal treatment is not less than 2 h, e.g., 3 h, 5 h, or 10 h.

According to an embodiment of the present disclosure, the ST thermal treatment is conducted in vacuum or in an inert gas atmosphere. For example, the inert gas is selected from nitrogen, argon, and the like.

According to an exemplary embodiment of the present disclosure, in step (3), the ST thermal treatment comprises a first temperature ramping stage, a first holding thermal treatment, a second temperature ramping stage, and a second holding thermal treatment, wherein the first temperature ramping stage comprises: raising the temperature from 400° C. to 790° C. in 70 min; the first holding thermal treatment comprises: holding the temperature at 790° C. for 480 min; the second temperature ramping stage comprises: raising the temperature from 790° C. to 940° C. in 30 min; and the second holding thermal treatment comprises: holding the temperature at 940° C. for 720 min.

According to an exemplary embodiment of the present disclosure, in step (3), the ST thermal treatment comprises a first temperature ramping stage, a first holding thermal treatment, a second temperature ramping stage, a second holding thermal treatment, a third temperature ramping stage, and a third holding thermal treatment, wherein the first temperature ramping stage comprises: raising the temperature from 420° C. to 750° C. in 70 min; the first holding thermal treatment comprises: holding the temperature at 750° C. for 300 min; the second temperature ramping stage comprises: raising the temperature from 750° C. to 810° C. in 30 min; the second holding thermal treatment comprises: holding the temperature at 810° C. for 420 min; the third temperature ramping stage comprises: raising the temperature from 780° C. to 870° C. in 40 min; and the third holding thermal treatment comprises: holding the temperature at 870° C. for 900 min.

In the prior art, during thermal diffusion treatment of a large sintered magnet (a thickness in the orientation direction ≥10 mm), it is prone to adopt a thermal treatment held at a single temperature basically in a range of 870-970° C. The diffusion driving force provided by different temperatures is different. When the thickness of the magnet is increased, the conventional method is to elevate the diffusion temperature so as to increase the diffusion driving force, thereby achieving a deeper diffusion of the heavy rare earth elements. However, when the diffusion thickness (i.e., the thickness of the magnet in the orientation direction) reaches 10 mm or more, the heavy rare earth elements are easily supersaturated on the surface of the large magnet due to the direct contact between the large magnet and the heavy rare earth elements. On one hand, the heavy rare earth elements may easily enter the main phase of the grain, and on the other hand, a heavy rare earth layer may be formed on the surface of the magnet to hinder the subsequent diffusion of the heavy rare earth. Although the present disclosure achieves the regulation and control of the heavy rare earth elements by increasing the M layer and improves the above problems, it is also found by the inventor that alternate low-temperature and high-temperature thermal treatments during the ST thermal treatment significantly improve the diffusion depth, and particularly, the diffusion effect is superior when the ST thermal treatment condition described above is adopted. This is attributed to that: in the low-temperature thermal diffusion treatment process, when the holding thermal treatment temperature is lower than 750° C., the RH of the heavy rare earth disposed on the surface of the magnet cannot be effectively diffused due to the excessively low temperature, and when the temperature is higher than 890° C., the diffusion efficiency is too high to allow a sufficient displacement of the heavy rare earth and Nd in the grain boundary, leading to enrichment of heavy rare earth on the surface of the magnet and thus a reduced RH diffusion depth. When the holding thermal treatment temperature is higher than 970° C. in the high-temperature thermal diffusion treatment process, the heavy rare earth elements disposed on the surface can directly enter the main phase due to the excessively high temperature, and the effect of grain boundary diffusion cannot be achieved.

According to an embodiment of the present disclosure, after the ST thermal treatment, a quenching process is required, and the quenching process may be conducted by a method known in the art, e.g., a vacuum cooling process without thermal power output.

According to an embodiment of the present disclosure, the blank is sequentially washed with an acid solution and deionized water, and dried before the diffusion part is disposed. The acid solution may be selected from an acid solution known in the art, such as an aqueous hydrogen chloride solution, an aqueous nitric acid solution, and the like.

According to an embodiment of the present disclosure, the method further comprises: (4) after quenching, conducting an aging treatment in the following condition: an aging temperature of 430-650° C., an aging time of greater than 30 min, and quenching to room temperature after the aging treatment is completed.

According to an embodiment of the present disclosure, the aging treatment is conducted in vacuum or in an inert gas atmosphere.

The present disclosure further provides use of the sintered R—Fe—B magnet described above in the fields of wind power generation, household motors, automobiles, medical equipment, or mobile communication devices, preferably in the field of wind power generation.

Beneficial Effects (1) The present disclosure provides a large sintered R—Fe—B magnet and a preparation method. Compared with the existing grain boundary diffusion method, the present disclosure solves the problems of the difficulty in the diffusion of the heavy rare earth into the magnet due to the excessive thickness of existing large sintered magnets, the excessive coercivity difference between the surface and the interior of the magnet after diffusion treatment, the excessive consumption of the heavy rare earth in diffusion, and the prolonged diffusion period.

(2) By disposing a diffusion part comprising an M layer and an RH layer on the surface of the blank of the magnet, and conducting a thermal diffusion treatment comprising a DW thermal treatment and an ST thermal treatment, a concentration adjustment layer is formed after the organic solid and the solvent in the diffusion layer are removed in the DW thermal treatment process, thus achieving the adjustment of the concentration of RH heavy rare earth. The heavy rare earth elements in the RH layer in the ST thermal treatment process are needed first to pass through the powder in the M layer to reach the surface of the magnet. Due to the presence of the M layer, the heavy rare earth is not in direct contact with the magnet, preventing the accumulation of heavy rare earth which may block the diffusion path in the grain boundary due to the excessive concentration of heavy rare earth on the surface of the magnet. The heavy rare earth concentration is controlled by the M layer during the diffusion, and will not be excessive due to the excessive amount of the heavy rare earth disposed on the surface of the magnet during the diffusion. The thermal diffusion treatment of a large sintered magnet is achieved by optimizing the structure of the diffusion part and combining a thermal diffusion treatment process, so as to give sintered magnets having a more uniform internal coercivity.

DETAILED DESCRIPTION

Figure 1:
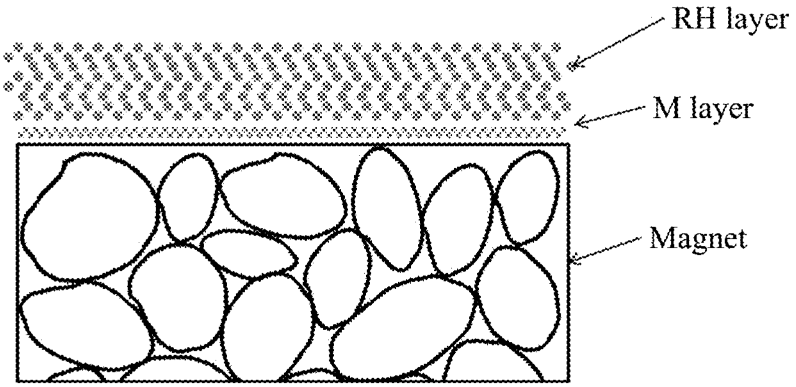
FIG. 1 is a schematic view of the state of a diffusion part undergone a DW thermal process.

The embodiments of the present disclosure will be further illustrated in detail with reference to the following specific examples. It will be appreciated that the following examples are merely exemplary illustrations and explanations of the present disclosure, and should not be construed as limiting the protection scope of the present disclosure. All techniques implemented based on the content of the present disclosure described above are included within the protection scope of the present disclosure. Unless otherwise stated, the raw materials and reagents used in the following examples are all commercially available products or can be prepared using known methods.

Example 1

The procedures for manufacturing the large sintered magnet are as follows:

(1) A neodymium-iron-boron magnet (R—Fe—B magnet) was prepared from raw materials according to the formula: 29.1% of Nd, 1.2% of Dy, 1.5% of Co, 0.2% of Al, 0.1% of Ga, 0.2% of Ti, 0.17% of Cu, 0.98% of B, and the remaining of Fe. Raw materials were smelted in a furnace through strip casting process to manufacture neodymium-iron-boron alloy flakes with a thickness in a range of 0.1-0.5 mm. The alloy flakes were subjected to coarse crushing with hydrogen embrittlement process to give a powder. The powder was ground with a jet mill to give a fine powder with an SMD of 2.85 μm. The fine powder was oriented in a magnetic field, compressed, and molded to give a compact blank with a density of 3.98 g/cm$^3$. The compact blank was then subjected to sintering in a sintering furnace and aging treatment to give a raw blank. The raw blank was processed to give a blank. The surface of the blank was washed with a nitric acid solution and deionized water, and dried to obtain a neodymium-iron-boron magnet blank A1 with dimensions of 80 mm×40 mm×11 mm, a dimensional tolerance of ±0.03 mm, and a thickness of Z=11 mm in the orientation direction of A1.

(2) Diffusion part was disposed. Diffusion parts were disposed on 2 surfaces in the orientation direction of the blank A1. Each of the diffusion parts was in a two-layer structure and comprised an M layer and an RH layer. The M layer was in direct contact with the surface of the blank A1, and the RH layer was disposed on the surface of the M layer. The specific procedures are as follows:

(a) The manufacturing procedures of the M layer are as follows: Graphite powder (the content of oxygen in powder was 0.07%), an organic solid rosin-modified alkyd resin, and ethanol were prepared into a first slurry according to weight percentages of 55 wt %, 2 wt %, and 43 wt %, respectively. The first slurry was applied to the surface of the blank A1 by spraying, and dried by hot air blast at 60° C. to give the M layer with a thickness of 3±2 μm.

(b) An RH layer was disposed on the surface of the dried M layer by the following procedures: Terbium hydride powder, an organic solid rosin-modified alkyd resin, and ethanol were prepared into a second slurry according to weight percentages of 62 wt %, 3 wt %, and 35 wt %, respectively. The second slurry was applied to the surface of the M layer described above by spraying, and dried by hot air blast at 60° C. to give the RH layer with a thickness of 50±15 μm. A blank A2 was obtained after the diffusion parts were disposed on the surface of the blank A1.

(3) Thermal diffusion treatment: The blank A2 was placed in a graphite container for thermal diffusion treatment. The thermal diffusion treatment process was conducted in vacuum, and heating was started when the vacuum degree was ≤10 Pa. The thermal diffusion treatment process mainly comprised heating, DW, ST, and cooling, as described below:

1) Heating: the temperature was raised to 400° C. in 80 min;
2) DW: the temperature was held at 400° C. for 240 min;
3) Heating: the temperature was raised from 400° C. to 850° C. in 70 min;
4) ST1: the temperature was held at 850° C. for 480 min;
5) Heating: the temperature was raised from 850° C. to 940° C. in 30 min;
6) ST2: the temperature was held at 940° C. for 1080 min;

(4) Aging treatment: After the thermal diffusion treatment was finished, argon was filled, and the system was quenched with a fan to a temperature below 80° C. After quenching, the system was heated to 500° C. for aging treatment at a ramping rate of 5° C./min. The temperature was held for 120 min (the aging treatment refers to a thermal treatment process in which alloy workpieces, after solution treatment, cold plastic formation or casting and forging, are placed at a high temperature or kept at room temperature to maintain the variation in performance, shape and size over time). After the aging treatment, argon was filled again, and the system was quenched with a fan to a temperature below 80° C. to give a finished sintered neodymium-iron-boron magnet A3.

FIG. 1 is a schematic view of the diffusion part undergone a DW thermal process. After the DW process, the organic solid and the solvent were removed from the diffusion parts in the M layer. As such, the M layer in the diffusion part mainly comprised graphite powder, and the RH layer mainly comprised terbium hydride powder.

Figure 2:
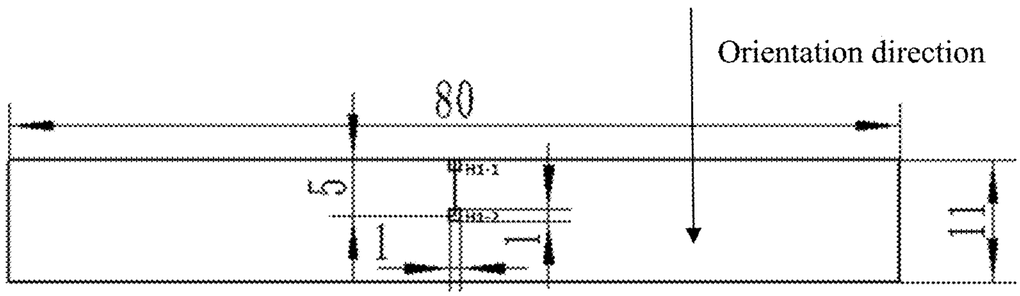
FIG. 2 is a schematic view of the sampling position on a sintered R—Fe—B magnet sample according to Example 1 (unit: mm).

(5) The above sintered neodymium-iron-boron magnet A3 was tested as follows:

1) Sampling: As shown in FIG. 2, a diffusion cross-section area was obtained by sectioning the sintered neodymium-iron-boron magnet A3 in the orientation direction of the A3, and samples with the dimensions of 1 mm×1 mm×1 mm were taken at the surface and a position 5 mm away from the surface of the sintered magnet in the diffusion cross-sectional area, which were respectively designated as H1-1 and H1-2.

The performances of the samples H1-1 and H1-2 of Example 1 were tested and compared. The results are shown in Table 1.

2) The test condition is as follows:

Sample size: 1 mm×1 mm×1 mm, tolerance: ±0.03 mm;
Temperature: 23° C.;
Instrument: HIRST PFM06 (upper detection limit of coercivity: 60 kOe, temperature range: 16-40° C., minimum sample size: B1×1×1).

TABLE 1

Performance of samples H1-1 and H1-2 in Example 1

| Item | Hcj (kA/m) | ΔH (kA/m) |
|---|---|---|
| H1-1 | 2154 | 42 |
| H1-2 | 2112 | |

Example 2

The procedures for manufacturing the large sintered magnet are as follows:

(1) A neodymium-iron-boron magnet (R—Fe—B magnet) was prepared from raw materials according to the formula: 28.6% of PrNd, 1.5% of Dy, 1.0% of Co, 0.1% of Al, 0.2% of Ga, 0.12% of Ti, 0.10% of Cu, 0.98% of B, and the remaining of Fe. Raw materials were smelted in a furnace through strip casting process to manufacture neodymium-iron-boron alloy flakes with a thickness in a range of 0.1-0.5 mm. The alloy flakes were subjected to coarse crushing with hydrogen embrittlement process to give a powder. The powder was ground with a jet mill to give a fine powder with an SMD of 2.85 μm. The fine powder was oriented in a magnetic field, compressed, and molded to give a compact blank with a density of 3.95 g/cm$^3$. The compact blank was then subjected to sintering in a sintering furnace and aging treatment to give a raw blank. The raw blank was processed to give a blank. The surface of the blank was washed with a nitric acid solution and deionized water, and dried to obtain a neodymium-iron-boron blank B1 with dimensions of 100 mm×50 mm×15 mm, a dimensional tolerance of ±0.03 mm, and a thickness of Z=15 mm in the orientation direction of B1.

(2) Diffusion part disposing: Diffusion part was disposed on a surface of the neodymium-iron-boron blank B1. The diffusion part was in a four-layer structure and comprised, sequentially from the surface of the neodymium-iron-boron blank B1, an M1 layer, an RH1 layer, an M2 layer, and an RH2 layer. The M1 layer was in direct contact with the blank B1. The specific procedures are as follows:

(a) The manufacturing procedures of the M1 layer are as follows: Molybdenum powder (the content of oxygen in powder was 0.65%), an organic solid polyvinyl butyral, and ethanol were prepared into a first slurry according to weight percentages of 60 wt %, 5 wt %, and 35 wt %, respectively. The first slurry was applied to the surface of the blank B1 by spraying, and dried by hot air blast at 60° C. to give the M1 layer with a thickness of 3±2 μm.

(b) An RH1 layer was disposed on the surface of the dried M1 layer by the following procedures: Dysprosium hydride powder, an organic solid polyvinyl butyral, and ethanol were prepared into a second slurry according to weight percentages of 60 wt %, 8 wt %, and 32 wt %, respectively. The second slurry was applied to the surface of the M1 layer by spraying, and dried by hot air blast at 60° C. to give the RH1 layer with a thickness of 40±15 μm.

(c) After drying, steps (a) and (b) were repeated to sequentially dispose an M2 layer and an RH2 layer with the first slurry and the second slurry in steps (a) and (b), respectively. The disposing of the diffusion parts on surfaces of the blank B1 was completed after drying to obtain a blank B2, with the thickness of the M2 layer being 2±1 μm and the thickness of the RH2 layer being 35±15 μm.

(3) Thermal diffusion treatment: The blank B2 was placed in a graphite container for thermal diffusion treatment. The thermal diffusion treatment process was conducted in vacuum. Heating was started when the vacuum degree is ≤10 Pa. The thermal diffusion treatment process mainly comprised heating, DW, ST, and cooling, as described below:

1) Heating: the temperature was raised from 50° C. to 420° C. in 80 min;
2) DW: the temperature was held at 420° C. for 240 min;
3) Heating: the temperature was raised from 420° C. to 750° C. in 70 min;
4) ST1: the temperature was held at 750° C. for 300 min;
5) Heating: the temperature was raised from 750° C. to 810° C. in 30 min;
6) ST2: the temperature was held at 810° C. for 420 min;
7) Heating: the temperature was raised from 780° C. to 870° C. in 40 min;
8) ST3: the temperature was held at 870° C. for 1200 min;

(4) Aging treatment: After the thermal diffusion treatment was finished, argon was filled, and the system was quenched with a fan to a temperature below 80° C. After quenching, the system was heated to 520° C. for aging treatment at a ramping rate of 5° C./min. The temperature was held for 300 min (the aging treatment refers to a thermal treatment process in which alloy workpieces, after solution treatment, cold plastic formation or casting and forging, are placed at a high temperature or kept at room temperature to maintain the variation in performance, shape and size over time). After the aging treatment, argon was filled again, and the system was quenched with a fan to a temperature below 80° C. to give a finished sintered neodymium-iron-boron magnet B3.

(5) The sintered neodymium-iron-boron magnet B3 of this example was tested with reference to Example 1, except that the A3 was replaced with the B3, and the samples were designated as H2-1 and H2-2. The test results are shown in Table 2.

TABLE 2

Performance of samples H2-1 and H2-2 in Example 2

| Item | Hcj (kA/m) | ΔH(kA/m) |
|---|---|---|
| H2-1 | 1920 | 38 |
| H2-2 | 1881 | |

Comparative Example 1

This comparative example produced a blank using the same process for manufacturing the samples as in Example 1, except that:

(2) Diffusion part disposing: Diffusion parts were disposed on 2 surfaces in the orientation direction of the blank A1, and an RH layer was directly disposed on the diffusion parts by the following procedures: Terbium hydride powder, an organic solid rosin-modified alkyd resin, and ethanol were prepared into a slurry according to weight percentages of 62 wt %, 3 wt %, and 35 wt %, respectively. The slurry was directly applied to the surface of the blank A1 by spraying, and dried by hot air blast at 60° C. to give the RH layer with a thickness of 50±15 μm.

The other steps (1), (3), and (4) were the same as Example 1, and a sintered neodymium-iron-boron magnet C3 was finally obtained in this comparative example.

(5) The sintered neodymium-iron-boron magnet C3 was tested with reference to Example 1, except that the A3 was replaced with the C3, and samples D3-1 and D3-2 of Comparative Example 1 were obtained.

TABLE 3

Performance of samples H3-1 and H3-2 in Comparative Example 1

| Item | Hcj (kA/m) | ΔH (kA/m) |
|---|---|---|
| D3-1 | 2159 | 83 |
| D3-2 | 2076 | |

Comparative Example 2

This comparative example produced a blank using the same process for manufacturing the samples as in Example 2, except that:

(2) Diffusion part disposing: The content of oxygen in the molybdenum powder used for the M layer was 5.5%, while the content of oxygen in the molybdenum powder used in Example 2 was 0.65%. The other steps (1), (3), and (4) were the same as Example 2, and a sintered neodymium-iron-boron magnet D4 was finally obtained in this comparative example. Samples D4-1 and D4-2 were manufactured for Comparative Example 2. It can be seen that the overall performance of the samples was reduced and the uniformity of coercivity was deteriorated.

TABLE 4

Performance of samples D4-1 and D4-2 in Comparative Example 2

| Item | Hcj (kA/m) | ΔH (kA/m) |
|---|---|---|
| D4-1 | 1902 | 65 |
| D4-2 | 1837 | |

Comparative Example 3

This comparative example was substantially the same as Example 2, except that the thermal diffusion treatment in step (3) is specifically as follows:

1) Heating: the temperature was raised from 50° C. to 420° C. in 80 min;
2) DW: the temperature was held at 420° C. for 240 min;
3) Heating: the temperature was raised from 420° C. to 870° C. in 140 min;
4) ST: the temperature was held at 870° C. for 900 min.

The other steps (1), (2), and (4) were the same as Example 1, and a sintered neodymium-iron-boron magnet E5 was finally obtained in this comparative example.

(5) The sintered neodymium-iron-boron magnet E5 of this example was tested with reference to Example 1, except that the A3 was replaced with the E5, and the samples were designated as E5-1 and E5-2. The test results are shown in Table 5.

TABLE 5

Performance of samples E5-1 and E5-2 in Comparative Example 3

| Item | Hcj (kA/m) | ΔH (kA/m) |
|---|---|---|
| E5-1 | 1913 | 67 |
| E5-2 | 1846 | |

The exemplary embodiments of the present disclosure have been described above. However, the protection scope of the present application is not limited to the above embodiments. Any modification, equivalent, improvement, and the like made by those skilled in the art without departing from the spirit and principle of the present disclosure shall fall within the protection scope of the present disclosure.

The invention claimed is:

1. A preparation method of a sintered R—Fe—B magnet, comprising following steps:
   - (1) manufacturing a blank of the R—Fe—B magnet having a thickness ≥10 mm;
   - (2) diffusion part disposing: disposing diffusion parts on at least two surfaces in an orientation direction of the blank obtained in step (1), wherein each of the diffusion parts comprises at least one RH layer and 1 M layer, the M layer is in direct contact with the surface of the blank, at least one M layer is disposed between the RH layer and the blank; and
   - (3) thermal diffusion treatment: conducting a thermal diffusion treatment on the blank with thick diffusion layers disposed in step (2) to give the sintered R—Fe—B magnet,
   - wherein a method for manufacturing the M layer comprises: applying a slurry containing an M powder on two surfaces of the blank in the orientation direction, and drying to form the M layer, wherein the slurry containing the M powder comprises the M powder, an organic solid, and optionally a solvent, wherein the mass ratio of the M powder to the organic solid to the solvent in the slurry containing the M powder is (20-70):(1-10):(0-50);
   - wherein the M powder includes at least one of graphite powder, titanium powder, zirconium powder, molybdenum powder, tungsten powder, titanium oxide, zirconium oxide, molybdenum oxide, and tungsten oxide, and M powder has an oxygen atom content less than 3%;
   - wherein the sintered R—Fe—B magnet has a thickness not less than 10 mm in an orientation direction, any cross section along the orientation direction is marked as a diffusion cross-section area and one side of the diffusion cross-section area facing an outer surface of the sintered R—Fe—B magnet is marked as the surface of the diffusion cross-section area, and difference between coercivity of the surface of the diffusion cross-section area and coercivity at 5 mm away from the surface of the diffusion cross-section area is ΔH, wherein ΔH is ≤50 kA/m.

2. The preparation method according to claim 1, wherein in step (2), the RH layer and the M layer are alternately disposed in the diffusion parts, wherein at least one M layer is disposed between the RH layer and the blank, the RH layer comprises 1-3 layers and the M layer comprises 1-3 layers.

3. The preparation method according to claim 1, wherein a method for manufacturing the RH layer comprises: applying an RH slurry on two surfaces of the blank in the orientation direction, and drying to form the RH layer, wherein
   - the RH slurry comprises a heavy rare earth element, an organic solid, and optionally a solvent;
   - the mass ratio of the heavy rare earth element to the organic solid to the solvent in the RH slurry is (40-70):(0.5-12):(0-50);
   - the heavy rare earth element includes at least one of metal dysprosium, metal terbium, dysprosium hydride, terbium hydride, dysprosium fluoride, terbium fluoride, dysprosium oxide, and terbium oxide;
   - the organic solid is at least one selected from rosin-modified alkyd resin, thermoplastic phenolic resin, urea-formaldehyde resin, and polyvinyl butyral; and
   - the solvent is at least one of an alcohol solvent, an ether solvent, and an aromatic hydrocarbon solvent.

4. The preparation method according to claim 1, wherein the M powder comprises a powder having a particle size less than 5 μm, wherein a powder having a particle size of between 0.5 μm and 1.8 μm is more than 50% of total mass of the powder.

5. The preparation method according to claim 1, wherein in step (3), the thermal diffusion treatment comprises at least a DW thermal treatment and an ST thermal treatment;
   - wherein the DW thermal treatment comprises: after a temperature is raised to a DW temperature, holding the temperature for a period of time; wherein the DW temperature is 280° C. to 480° C.; the period of time of the DW thermal treatment is greater than or equal to 2 h; and
   - the DW thermal treatment is conducted in vacuum.

6. The preparation method according to claim 5, wherein in step (3), the ST thermal treatment comprises a low-temperature thermal treatment and a high-temperature thermal treatment, wherein the temperature of the low-temperature thermal treatment is 750° C. to 890° C., and a temperature of the high-temperature thermal treatment is 830° C. to 970° C., wherein difference between temperatures of the low-temperature thermal treatment and the high-temperature thermal treatment is greater than 30° C., and time of the low-temperature thermal treatment and/or the high-temperature thermal treatment is not greater than 50 h, wherein a holding time is ≥2 h; a ramping rate from the low-temperature thermal treatment to the high-temperature thermal treatment is 4-10° C./min;
   - the low-temperature thermal treatment comprises: after the temperature is raised to the temperature of the low-temperature thermal treatment, holding the temperature for a period of time;
   - the high-temperature thermal treatment comprises: after the temperature is raised to the temperature of the high-temperature thermal treatment, holding the temperature for a period of time;
   - in step (3), the ST thermal treatment comprises alternate low-temperature thermal treatments and high-temperature thermal treatments;
   - a time of the ST thermal treatment is not less than 2 h; and
   - the ST thermal treatment is conducted in vacuum or in an inert gas atmosphere.

7. The preparation method according to claim 1, wherein the blank is sequentially washed with an acid solution and deionized water, and dried before the diffusion part is disposed.

8. The preparation method according to claim 2, wherein the diffusion part comprises one M layer and one RH layer.

9. The preparation method according to claim 2, wherein the diffusion part comprises two M layers and two RH layers disposed in an order from the surface of the blank of a first M layer, a first RH layer, a second M layer, and a second RH layer, wherein the first M layer and the second M layer is identical or different, and the first RH layer and the second RH layer is identical or different.

10. The preparation method according to claim 1, wherein in the diffusion part, each RH layer has a thickness of 1 μm to 70 μm.

11. The preparation method according to claim 1, wherein in the diffusion part, each M layer has a thickness less than 20 μm and greater than 0.1 μm.

12. The preparation method according to claim 1, wherein in the diffusion part, the thickness ratio of each RH layer to each M layer is (1-70):(0.1-20).

13. The preparation method according to claim 4, wherein the powder having a particle size of between 0.5 μm and 1.8 μm is more than 65% of the total mass of the powder.

14. The preparation method according to claim 5, wherein the DW temperature is 320° C. to 400° C.

15. The preparation method according to claim 1, wherein the method further comprises: (4) after quenching, conducting an aging treatment in following condition: an aging temperature of 430-650° C., and an aging time of greater than 30 min, and quenching to room temperature after the aging treatment is completed, wherein the aging treatment is conducted in vacuum or in an inert gas atmosphere.

16. The preparation method according to claim 1, wherein M powder has an oxygen atom content less than 1%.

17. The preparation method according to claim 1, wherein ΔH is not greater than 45 kA/m.

* * * * *